(12) United States Patent
Zhang et al.

(10) Patent No.: US 11,175,468 B2
(45) Date of Patent: Nov. 16, 2021

(54) OPTICAL FIBER JUNCTION ASSEMBLY AND SEALING METHOD THEREOF, AND OPTICAL FIBER JUNCTION BOX

(71) Applicant: Huawei Technologies Co., Ltd., Shenzhen (CN)

(72) Inventors: Zhijian Zhang, Wuhan (CN); Anliang Yang, Shenzhen (CN); Jian Cheng, Wuhan (CN); Biao Qi, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/993,714

(22) Filed: Aug. 14, 2020

(65) Prior Publication Data
US 2021/0026089 A1 Jan. 28, 2021

Related U.S. Application Data

(63) Continuation of application No. PCT/CN2019/097875, filed on Jul. 26, 2019.

(51) Int. Cl.
*G02B 6/00* (2006.01)
*G02B 6/44* (2006.01)
*G02B 6/38* (2006.01)

(52) U.S. Cl.
CPC ......... *G02B 6/4446* (2013.01); *G02B 6/3897* (2013.01); *G02B 6/4444* (2013.01)

(58) Field of Classification Search
CPC .. G02B 6/4446; G02B 6/3897; G02B 6/4444; G02B 6/00
See application file for complete search history.

(56) References Cited

U.S. PATENT DOCUMENTS

| | | | | |
|---|---|---|---|---|
| 5,684,911 | A * | 11/1997 | Burgett | G02B 6/4446 385/135 |
| 6,085,013 | A * | 7/2000 | Yatsu | G02B 6/4445 385/135 |
| 6,314,229 | B1 * | 11/2001 | Sasaki | G02B 6/4444 385/135 |
| 2004/0095444 | A1 | 5/2004 | Drummond et al. | |
| 2005/0041934 | A1 | 2/2005 | Zama et al. | |
| 2007/0116413 | A1 | 5/2007 | Cox | |

(Continued)

FOREIGN PATENT DOCUMENTS

| | | |
|---|---|---|
| CN | 101395514 B | 12/2010 |
| CN | 102207588 A | 10/2011 |

(Continued)

*Primary Examiner* — Jennifer Doan
(74) *Attorney, Agent, or Firm* — Conley Rose, P.C.

(57) ABSTRACT

An optical fiber junction assembly and a sealing method thereof, and an optical fiber junction box, where in the optical fiber junction assembly, a first housing has first mating surface and an accommodating cavity, a first welding bump is disposed on the first mating surface, and is disposed around an opening of the accommodating cavity, a second welding bump is disposed on the second mating surface, the first welding bump and the second welding bump are configured to form colloid after being heated and melted, and connect and seal the first mating surface and the second mating surface, and an overflow groove is disposed on at least one of the first mating surface and the second mating surface, and is configured to accommodate the colloid.

20 Claims, 14 Drawing Sheets

(56) References Cited

U.S. PATENT DOCUMENTS

2011/0242434 A1 10/2011 Hisada et al.
2014/0126954 A1 5/2014 Bhosale et al.

FOREIGN PATENT DOCUMENTS

| CN | 102227588 | A | 10/2011 |
| CN | 203688870 | U | 7/2014 |
| CN | 205647996 | U | 10/2016 |
| CN | 107370855 | A | 11/2017 |
| JP | H0511071 | A | 1/1993 |
| WO | 03081734 | A1 | 10/2003 |

* cited by examiner

OPTICAL FIBER JUNCTION ASSEMBLY AND SEALING METHOD THEREOF, AND OPTICAL FIBER JUNCTION BOX

CROSS-REFERENCE TO RELATED APPLICATION

This is a continuation of International Patent Application No. PCT/CN2019/097875 filed on Jul. 26, 2019, which is hereby incorporated by reference in its entirety.

TECHNICAL FIELD

This application relates to the field of optical communication technologies, and in particular, to an optical fiber junction assembly and a sealing method thereof, and an optical fiber junction box.

BACKGROUND

Fiber-optic communication is a communication mode in which an optical wave is used as an information carrier and an optical fiber is used as a transmission medium. Because the fiber-optic communication has advantages such as a large capacity, long-distance transmission, and anti-electromagnetic interference, the fiber-optic communication better meets requirements of communications technologies on a large amount of information and high precision, and the transmission medium such as the optical fiber can be widely promoted because of a low price of the fiber-optic communication. Currently, an optical fiber network has gradually been used in households, namely, fiber-to-the-home (FTTH). As an important access device in an FTTH project, an optical fiber junction box is increasingly widely applied to an FTTH technology.

The optical fiber junction box usually includes an upper cover and a lower bottom that are connected using a bolt, and a rubber ring is provided between the upper cover and the lower bottom. In a procedure of connecting the upper cover to the lower bottom using the bolt, the rubber ring may be extruded by the upper cover and the lower bottom such that the rubber ring can fill a gap between the upper cover and the lower bottom. However, the rubber ring may encounter creep deformation during long-term use, thereby reducing sealing performance of the optical fiber junction box.

SUMMARY

Embodiments of this application provide an optical fiber junction assembly and a sealing method thereof, and an optical fiber junction box, to resolve a problem that sealing performance of an optical fiber junction box is reduced due to aging of a rubber ring.

To achieve the foregoing objective, the following technical solutions are used in this application.

According to a first aspect of the embodiments of this application, an optical fiber junction assembly is provided. The optical fiber junction assembly includes a first housing, a first welding bump, a second housing, a second welding bump, and an overflow groove. The first housing has a first mating surface and an accommodating cavity. An opening of the accommodating cavity is provided on the first mating surface. A plurality of optical fiber connection ports is disposed on the first housing. The first welding bump is disposed on the first mating surface, and is disposed around the opening of the accommodating cavity. The second housing has a second mating surface. When the second housing is docked with the first housing, the second mating surface is disposed opposite to the first mating surface, and covers the opening of the accommodating cavity. The second welding bump is disposed on the second mating surface. When the first housing is docked with the second housing, the second welding bump is in contact with the first welding bump. The first welding bump and the second welding bump are configured to form colloid after being heated and melted, and connect and seal the first mating surface and the second mating surface. In addition, the overflow groove is disposed on at least one of the first mating surface and the second mating surface. The overflow groove is configured to accommodate the colloid. Therefore, the colloid can be prevented from remaining on surfaces of the first housing and the second housing during overflowing, thereby avoiding impact on appearance of an optical fiber junction box.

In view of the above, after an optical fiber completes optical fiber junction in the accommodating cavity of the first housing, the first welding bump on the first housing and the second welding bump on the second housing are melted through a welding process to form the colloid. The first housing and the second housing are then docked, and the first housing and the second housing are extruded using a clamp such that colloid remaining between the first housing and the second housing forms a connection layer. The connection layer can connect the first housing to the second housing. The first welding bump on the first housing is disposed around the opening of the accommodating cavity, and the second welding bump on the second housing is in contact with the first welding bump after the first housing and the second housing are docked. Therefore, the connection layer formed by the melted first welding bump and second welding bump can also be disposed around the opening of the accommodating cavity. Thus, after the first housing and the second housing are docked and extruded, a gap between the first housing and the second housing can be filled with the connection layer around the accommodating cavity. In this way, the second housing can seal an internal component in the accommodating cavity while blocking the opening of the accommodating cavity. This can reduce a probability that heat, cold, light, oxygen, and microorganisms in the outside nature enter the accommodating cavity such that the optical fiber junction box has a specified Ingress Protection (IP) rating. In this case, the optical fiber junction box provided in this embodiment of this application is of a fully sealed structure. A junction process of an optical fiber inside the closure is completed before delivery of the optical fiber junction box. An external optical fiber and the optical fiber inside the closure can be spliced provided that the external optical fiber is inserted into an optical fiber connector on the first housing such that the optical fiber junction box achieves a plug-and-play effect. In addition, because the first housing and the second housing are connected using the connection layer formed by melting the first welding bump and the second welding bump, the sealed optical fiber junction box provided in this application does not need to be sealed by extruding a rubber ring using a screw thread. In this way, a problem that sealing performance of the optical fiber junction box is reduced because the rubber ring encounters creep deformation during long-term use can be avoided. Further, it can be learned from the foregoing descriptions that the first welding bump and the first housing may be of an integrated structure, and the second welding bump and the second housing may be of an integrated structure. The connection layer formed by heating and melting the first welding bump and the second welding bump connects the first housing to the second housing. Therefore, an additional sealant such as a resin including a magnetically active material does not need to be added between the first housing and the second housing of the optical fiber junction box provided in this embodiment of this application such that complexity of the welding process and manufacturing costs can be reduced.

Optionally, the overflow groove includes a first overflow groove disposed on the first mating surface. The first overflow groove is disposed around the first welding bump. The first overflow groove is mainly configured to accommodate colloid formed by melting the first welding bump. In this way, the first overflow groove accommodates the colloid formed by melting the first welding bump such that an overflowing part of the colloid after extrusion can be prevented from adhering to inner and outer surfaces of the first housing and the second housing, thereby avoiding impact on appearance of the optical fiber junction assembly.

Optionally, a groove wall of the first overflow groove is formed on a side surface that is of the first welding bump and that faces the first overflow groove. In this way, the first overflow groove is closest to the first welding bump such that liquid colloid formed by heating and melting the first welding bump can quickly flow into the first overflow groove.

Optionally, the overflow groove includes a second overflow groove disposed on the second mating surface. The second overflow groove is disposed around the second welding bump. When the first housing is docked with the second housing, the second overflow groove and the first overflow groove are symmetrically disposed. A disposing manner of the second overflow groove is the same as that of the first overflow groove, and details are not described herein again. The second overflow groove is mainly configured to accommodate colloid formed by melting the second welding bump.

Optionally, a surface of one side that is of the first welding bump and that is close to the accommodating cavity is flush with an inner wall of the accommodating cavity. In this way, when a wall thickness of a side wall of the accommodating cavity of the first housing is limited, it can be ensured that the melted first welding bump can provide enough colloid to form the connection layer between the first housing and the second housing together with the melted second welding bump.

Optionally, the first welding bump and the first housing are made of a same material and are of an integrated structure. For example, the first welding bump and the first housing may be both made of injection molding materials, and therefore the first welding bump and the first housing of the integrated structure are formed through an injection molding process.

According to a second aspect of the embodiments of this application, a method for sealing the optical fiber junction assembly described above is provided. The optical fiber junction assembly includes a first housing, a first welding bump, a second housing, a second welding bump, and an overflow groove. The first housing has a first mating surface and an accommodating cavity. An opening of the accommodating cavity is provided on the first mating surface. A plurality of optical fiber connection ports is disposed on the first housing. The first welding bump is disposed on the first mating surface, and is disposed around the opening of the accommodating cavity. The second housing has a second mating surface. When the second housing is docked with the first housing, the second mating surface is disposed opposite to the first mating surface, and covers the opening of the accommodating cavity. The second welding bump is disposed on the second mating surface. When the first housing is docked with the second housing, the second welding bump is in contact with the first welding bump. The first welding bump and the second welding bump are configured to form colloid after being heated and melted, and connect and seal the first mating surface and the second mating surface. In addition, the overflow groove is disposed on at least one of the first mating surface and the second mating surface. The overflow groove is configured to accommodate the colloid. The method for sealing the optical fiber junction assembly includes first, melting the first welding bump and the second welding bump, then docking the first housing with the second housing, and extruding the first housing and the second housing, where at least a part of the melted first welding bump and second welding bump forms a connection layer between the first housing and the second housing, and then curing the connection layer, and connecting the first housing to the second housing using the connection layer. The method for sealing the optical fiber junction assembly has a same beneficial effect as the optical fiber junction assembly provided in the foregoing embodiment, and details are not described herein again.

According to a third aspect of the embodiments of this application, an optical fiber junction box is provided, including a first housing, a second housing, and a connection layer. The first housing has a first mating surface and an accommodating cavity. An opening of the accommodating cavity is provided on the first mating surface. A plurality of optical fiber connection ports is disposed on the first housing. The second housing is docked with the first housing. The second housing has a second mating surface disposed opposite to the first mating surface, and the second mating surface covers the opening of the accommodating cavity. The connection layer is located between the first mating surface and the second mating surface, and is disposed around the opening of the accommodating cavity. The connection layer is configured to connect the first mating surface to the second mating surface, and seal the accommodating cavity. The connection layer is made of a plastic material. In addition, an overflow groove is disposed on at least one of the first mating surface and the second mating surface. The overflow groove accommodates colloid that is made of the same material as the connection layer. The optical fiber junction box has a same technical effect as the optical fiber junction assembly provided in the foregoing embodiment, and details are not described herein again.

Optionally, a longitudinal section of the overflow groove is L-shaped or rectangular. The longitudinal section is perpendicular to at least one of the first mating surface and the second mating surface. When the longitudinal section of the overflow groove is rectangular, colloid that overflows after colloid formed by melting the first welding bump and the second welding bump is extruded can be effectively accommodated and blocked, thereby preventing the overflowing colloid from further flowing to a surface of the first housing or the second housing. In addition, when an amount of colloid that overflows after the first welding bump and the second welding bump are melted and extruded is relatively small, the longitudinal section of the overflow groove may be set to an L shape. The L-shaped overflow groove may form an art designing groove, and the art designing groove may visually block the connection layer between the first housing and the second housing, thereby improving appearance of the optical fiber junction box.

Optionally, a chamfer exists at a junction position between a groove bottom and a groove wall of the overflow groove. The chamfer facilitates flowing of colloid in the overflow groove such that overflowing colloid can be more easily filled in the overflow groove.

Optionally, the overflow groove includes a first overflow groove disposed on the first mating surface. The first overflow groove is disposed around the connection layer. A technical effect of the first overflow groove is the same as that described above, and details are not described herein again.

Optionally, the optical fiber junction box includes one first overflow groove. The first overflow groove is located on one side that is of the connection layer and that is away from the accommodating cavity. In this way, colloid formed by melting the first welding bump can flow into the first overflow groove such that the colloid formed by melting the first welding bump is prevented from overflowing to an outer surface of the optical fiber junction box in an extrusion procedure, thereby avoiding impact on appearance of the optical fiber junction box.

Optionally, the optical fiber junction box includes two first overflow grooves a first outer overflow groove and a first inner overflow groove. The first outer overflow groove is located on one side that is of the connection layer and that is away from the accommodating cavity. The first inner overflow groove is located on one side that is of the connection layer and that is close to the accommodating cavity. In this way, a part of colloid flowing to the outside of the first housing and the second housing in the colloid that overflows after the first welding bump and the second welding bump are melted and extruded may be accommodated in the first outer overflow groove and a second outer overflow groove. A part of colloid flowing to the inside of the first housing and the second housing in the foregoing overflowing colloid may be accommodated in the first inner overflow groove and a second inner overflow groove.

Optionally, a volume of the first inner overflow groove is less than or equal to a volume of the first outer overflow groove. The part of colloid flowing to the inside of the first housing and the second housing in the colloid that overflows after the first welding bump and the second welding bump are heated, melted, and extruded has little impact on appearance of the optical fiber junction box. Therefore, to reduce an area that is of a wall thickness of a side wall of the accommodating cavity of the first housing and that is occupied by the overflow groove, the volume of the first inner overflow groove may be less than or equal to the volume of the first outer overflow groove.

Optionally, the overflow groove includes a second overflow groove disposed on the second mating surface. The second overflow groove is disposed around the connection layer. A technical effect of the second overflow groove is the same as that described above, and details are not described herein again.

Figure 1A:
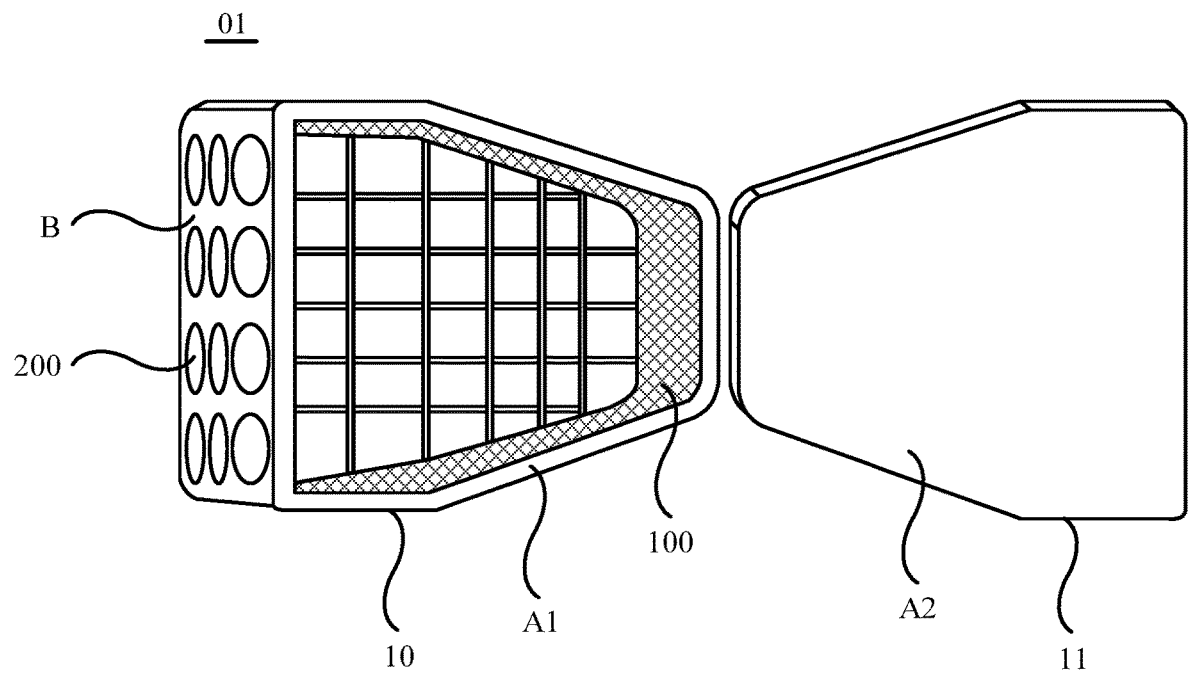
FIG. 1A is a schematic structural diagram of an optical fiber junction assembly according to some embodiments of this application.

Reference numerals: 01—Optical fiber junction assembly; 10—First housing; 11—Second housing; 100—Accommodating cavity; 200—Optical fiber connection port; 13—First welding bump; 14—Second welding bump; 201—Optical fiber connector; 15—Connection layer; 21—First overflow groove; 22—Second overflow groove; 12—Overflowing part.

DESCRIPTION OF EMBODIMENTS

The following describes the technical solutions in embodiments of this application with reference to the accompanying drawings in the embodiments of this application. The described embodiments are merely a part rather than all of the embodiments of this application.

The following terms "first", "second", and the like are merely used description, and shall not be understood as an indication or implication of relative importance or implicit indication of the number of indicated technical features. Therefore, a feature limited by "first", "second", or the like may explicitly or implicitly include one or more features.

In addition, in this application, orientation terms such as "upper", "lower", "left", and "right" are defined relative to orientations in which components in the accompanying drawings are schematically placed. It should be understood that these orientation terms are relative concepts and are used for relative description and clarification, and may change accordingly based on changes of the orientations in which the components in the accompanying drawings are placed.

In this application, the term "connection" should be understood in a broad sense unless there is a specific stipulation and limitation. For example, the "connection" may be a fixed connection, a detachable connection, or an integral connection, or may be a direct connection, or an indirect connection through an intermediate medium.

An embodiment of this application provides an optical fiber junction assembly 01, including a first housing 10 and a second housing 11 shown in FIG. 1A. The first housing 10 has a first mating surface A1 and an accommodating cavity 100. An opening of the accommodating cavity 100 is provided on the first mating surface A1. A plurality of optical fiber connection ports 200 are disposed on the first housing 10, for example, on a surface B in FIG. 1A.

Figure 2:
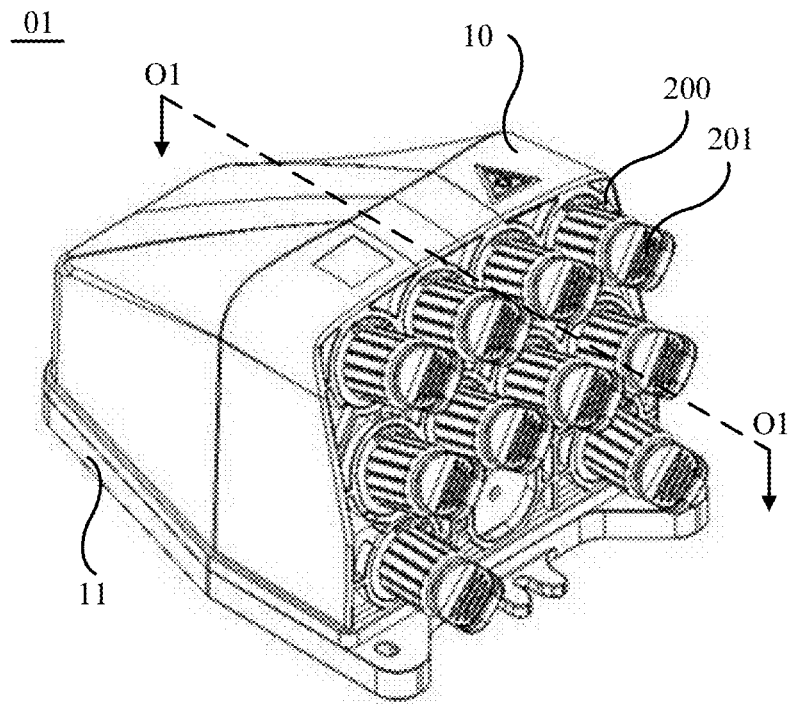
FIG. 2 is another schematic structural diagram of an optical fiber junction assembly according to some embodiments of this application.

As shown in FIG. 2, optical fiber connectors 201 are disposed on some optical fiber connection ports 200. The optical fiber connector 201 may enable an optical fiber in the accommodating cavity 100 and an external optical fiber to be detachably electrically connected, and fasten and support the optical fibers.

Internal components for optical fiber junction may be disposed in the accommodating cavity 100, for example, a splicing tray, an optical splitter, a fiber spool for coiling a redundant optical fiber, and a fiber baffle. Structures and types of the internal components are not limited in this application, provided that it can be ensured that the internal components are all disposed in the accommodating cavity 100.

Figure 3:
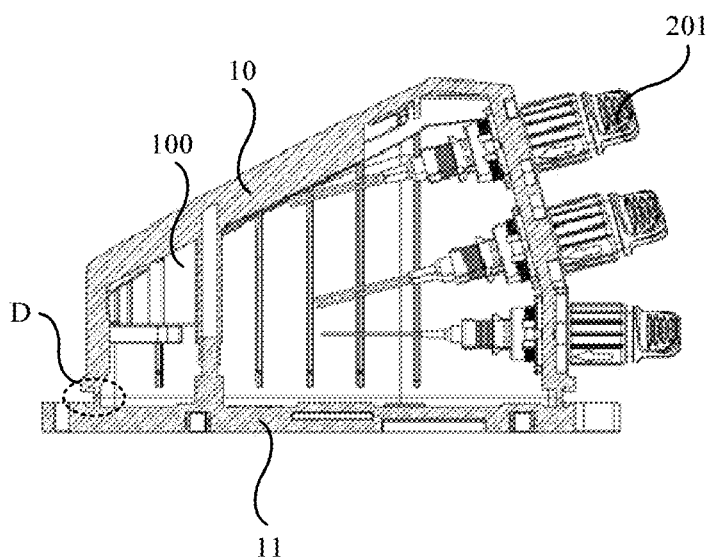
FIG. 3 is a top view obtained by performing sectioning along a dashed line O1-O1 in FIG. 2.

In addition, the second housing 11 has a second mating surface A2. When the second housing 11 is docked with the first housing 10, the second mating surface A2 is disposed opposite to the first mating surface A1, and covers the opening of the accommodating cavity 100. If the foregoing internal components used for optical fiber junction are all located in the accommodating cavity 100, after the second housing 11 is docked with the first housing 10, as shown in FIG. 3 (a cross-sectional view obtained by performing sectioning along a dashed line O1-O1 in FIG. 2), the second housing 11 may be configured to block the opening of the accommodating cavity 100 using the second mating surface A2.

Figure 1B:
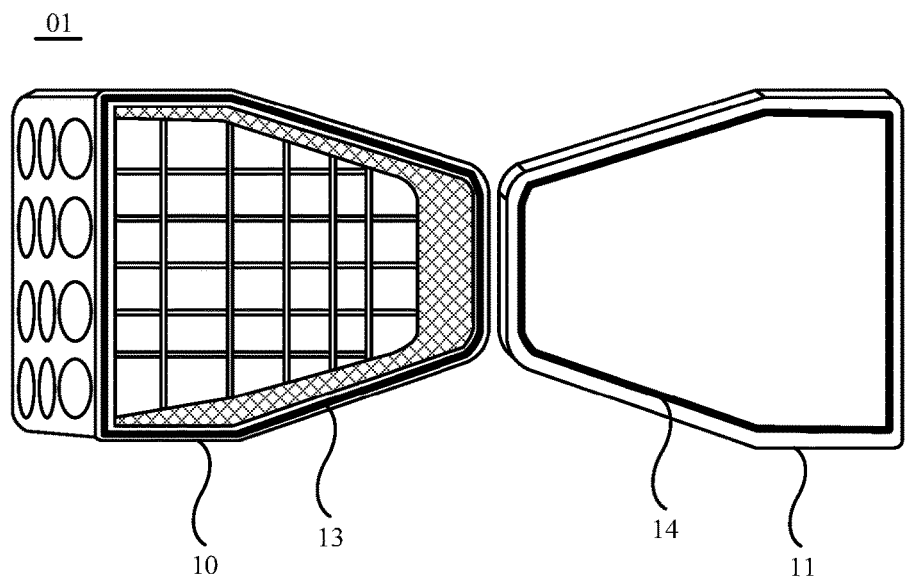
FIG. 1B is another schematic structural diagram of an optical fiber junction assembly according to some embodiments of this application.

On this basis, to connect the first housing 10 to the second housing 11, the optical fiber junction assembly 01 further includes a first welding bump 13 and a second welding bump 14 shown in FIG. 1B.

The first welding bump 13 is disposed on the first mating surface A1 (as shown in FIG. 1A) of the first housing 10. In addition, the first welding bump 13 is disposed around the opening of the accommodating cavity 100. The second welding bump 14 is disposed on the second mating surface A2 (as shown in FIG. 1A) of the second housing 11.

In some embodiments of this application, when the first welding bump 13 and the second welding bump 14 are made of plastic materials, the first welding bump 13 and the second welding bump 14 may be melted in a heated state to form colloid, to connect and seal the first housing 10 and the second housing 11.

It should be noted that, the case in which a component in this application such as the first welding bump 13 is disposed around the opening of the accommodating cavity 100 means that the first welding bump 13 may be disposed around the opening of the accommodating cavity 100 for at least one circle. Alternatively, in some other embodiments, the first welding bump 13 is disposed around the opening of the accommodating cavity 100 for approximately one circle, and the first welding bump 13 is not of a closed structure that is connected head to tail. A specific structure of the first welding bump 13 is not limited in this application, provided that it can be ensured that the colloid formed by melting the first welding bump 13 and the second welding bump 14 in the heated state can connect and seal the first housing 10 and the second housing 11.

In this case, in some embodiments of this application, the first housing 10 and the second housing 11 may be made of plastic materials. Alternatively, in some other embodiments of this application, the first housing 10 and the second housing 11 may be made of metal materials. Through an injection molding process, the first housing 10 and the first welding bump 13 are of an integrated structure, and the second housing 11 and the second welding bump 14 are of an integrated structure.

Figure 4A:
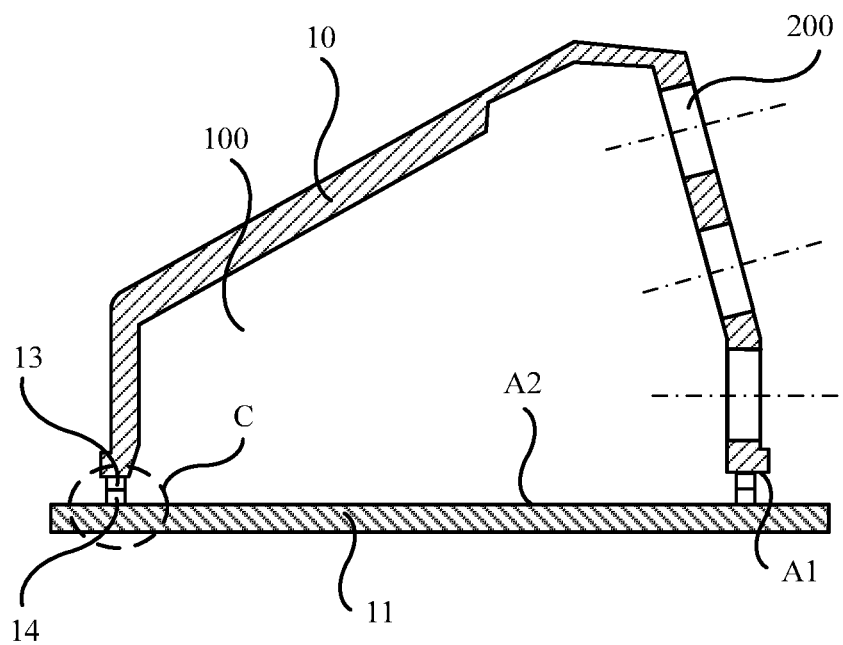
FIG. 4A is another top view obtained by performing sectioning along a dashed line O1-O1 in FIG. 2.

In this case, as shown in FIG. 4A, when the first housing 10 is docked with the second housing 11, the first welding bump 13 on the first housing 10 is in contact with the second welding bump 14 on the second housing 11. The first welding bump 13 and the second welding bump 14 are configured to form a connection layer 15 shown in FIG. 4B after being heated and melted. The connection layer 15 may connect and seal the first mating surface A1 of the first housing 10 and the second mating surface A2 of the second housing 11.

Figure 5:
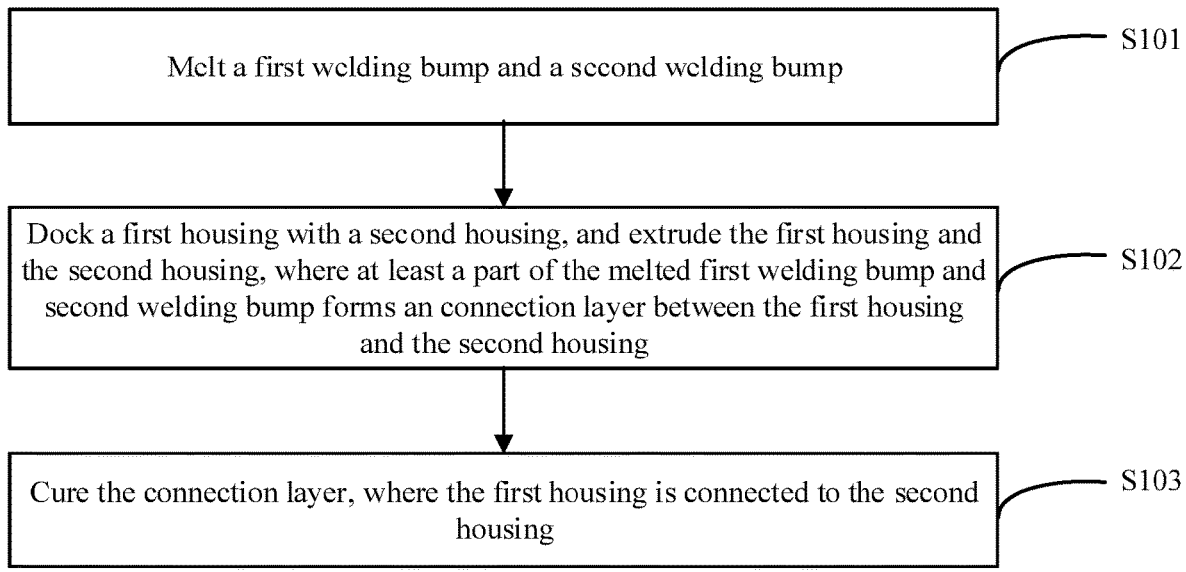
FIG. 5 is a flowchart of a method for sealing an optical fiber junction assembly according to some embodiments of this application.

Based on this, after an optical fiber is inserted into the optical fiber connector 201 shown in FIG. 2 and completes optical fiber junction in the accommodating cavity 100 of the first housing 10, the second housing 11 may be docked with the first housing 10, to seal an internal component in the accommodating cavity 100 of the first housing 10. In this way, an optical fiber junction box is formed. An embodiment of this application provides a method for sealing the optical fiber junction assembly 01. As shown in FIG. 5, the method includes S101 to S103.

S101. Melt a first welding bump 13 and a second welding bump 14 shown in FIG. 4A.

For example, the first welding bump 13 on a first housing 10 and the second welding bump 14 on a second housing 11 may be separately heated through a hot plate welding process or an ultrasonic welding process such that the first welding bump 13 and the second welding bump 14 are melted.

Figure 4B:
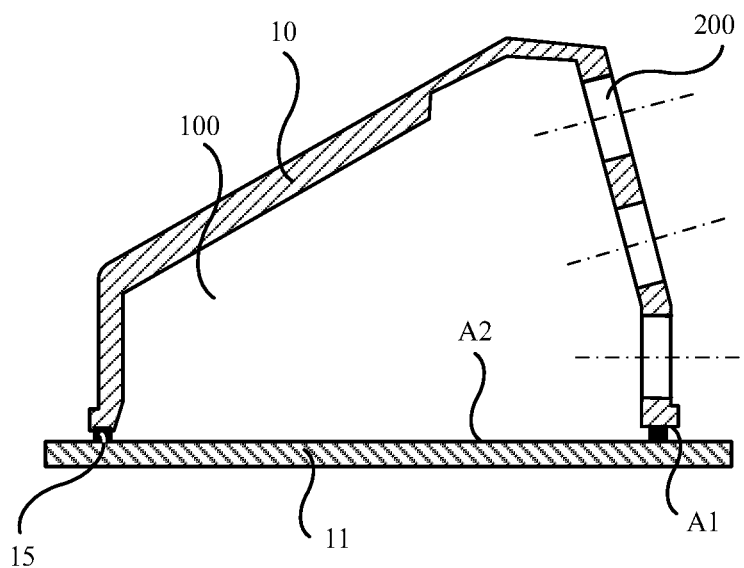
FIG. 4B is another top view obtained by performing sectioning along a dashed line O1-O1 in FIG. 2.

S102. Dock the first housing 10 with the second housing 11, and extrude the first housing 10 and the second housing 11, where at least a part of the melted first welding bump 13 and second welding bump 14 forms a connection layer 15 (as shown in FIG. 4B) between the first housing 10 and the second housing 11.

For example, the first welding bump 13 and the second welding bump 14 are melted to form colloid. The first housing 10 is docked with the second housing 11 such that a first mating surface A1 of the first housing 10 is disposed opposite to a second mating surface A2 of the second housing 11. Then the first housing 10 and the second housing 11 are extruded using a clamp such that a part of the colloid is extruded out of the first housing 10 and the second housing 11, and the other part of the colloid between the first housing 10 and the second housing 11 forms the connection layer 15.

S103. Cure the connection layer 15, where the first housing 10 is connected to the second housing 11.

For example, in some embodiments of this application, static airing treatment may be performed on a component on which S102 is performed such that the connection layer 15 is cured. Alternatively, in some other embodiments of this application, the connection layer 15 may be cured through a process such as drying, to connect the first housing 10 to the second housing 11. After the method for sealing the optical fiber junction assembly 01 is adopted, an optical fiber junction box is formed.

In some embodiments of this application, the optical fiber junction box may be a fiber access terminal (FAT), a splitting and splicing closure (SSC), a terminal box (TB), or the like, or may be another box or case that can be applied to an optical distribution network (ODN).

A specific form of the optical fiber junction box is not particularly limited in this embodiment of this application. In this application, any optical fiber junction box includes the first housing 10, the second housing 11, and the connection layer 15 shown in FIG. 4B.

It can be learned from the foregoing descriptions that the first housing 10 has a first mating surface A1 and an accommodating cavity 100 shown in FIG. 1A. An opening of the accommodating cavity 100 is provided on the first mating surface A1. A plurality of optical fiber connection ports 200 are disposed on the first housing 10. The second housing 11 is docked with the first housing 10. The second housing 11 has a second mating surface A2 disposed opposite to the first mating surface A1 of the first housing 10, and the second mating surface A2 covers the opening of the accommodating cavity 100.

In addition, the connection layer 15 is located between the first mating surface A1 and the second mating surface A2, and is disposed around the opening of the accommodating cavity 100. The connection layer 15 is configured to connect the first mating surface A1 to the second mating surface A2 such that the second housing 11 having the second mating surface A2 can block and seal the opening of the accommodating cavity 100. When the first housing 10 and the second housing 11 are both made of plastic materials, the connection layer 15 may be made of the same material as the first housing 10 and the second housing 11.

Figure 4C:
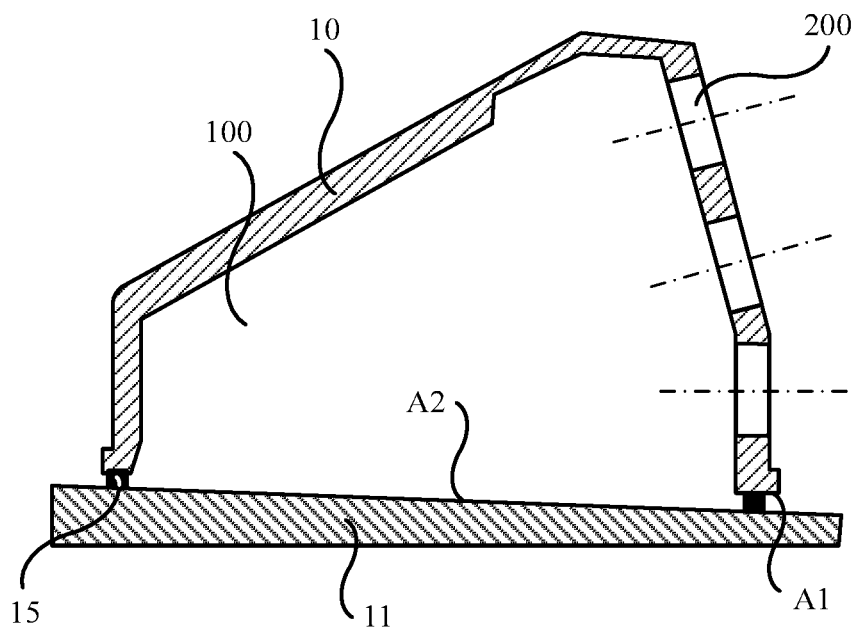
FIG. 4C is another top view obtained by performing sectioning along a dashed line O1-O1 in FIG. 2.
Figure 4D:
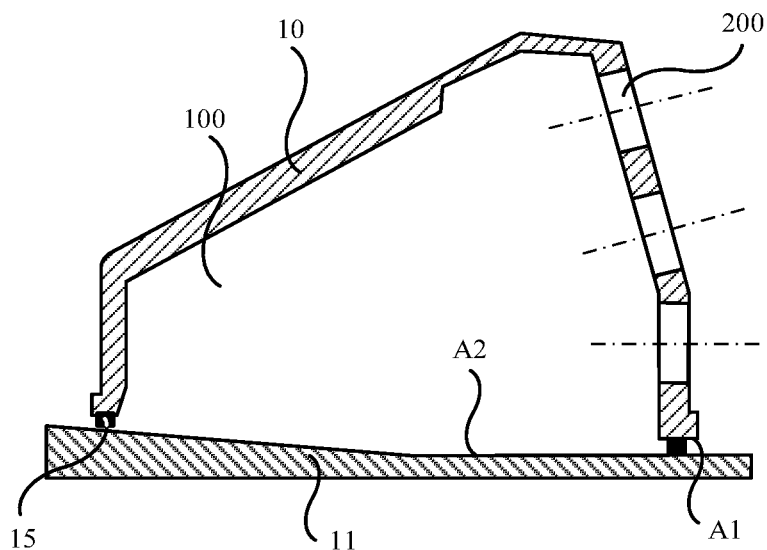
FIG. 4D is another top view obtained by performing sectioning along a dashed line O1-O1 in FIG. 2.

It should be noted that the foregoing embodiment is described using an example in which the second mating surface A2 of the second housing 11 is a planar surface shown in FIG. 4B. In some other embodiments of this application, as shown in FIG. 4C, the second mating surface A2 of the second housing 11 may be an inclined surface. Alternatively, in some other embodiments of this application, as shown in FIG. 4D, the second mating surface A2 of the second housing 11 is a folded surface having a specified bending angle.

A disposing manner of the second mating surface A2 of the second housing 11 is not limited in this application, and a person skilled in the art may set the disposing manner based on a structure of an internal component in the accommodating cavity 100 of the first housing 10, provided that the second housing 11 having the second mating surface A2 can block and seal the opening of the accommodating cavity 100 after the connection layer 15 connects the first mating surface A1 to the second mating surface A2. For ease of description, the following provides descriptions using an example in which the second mating surface A2 is the planar surface shown in FIG. 4B.

In view of the above, after an optical fiber is inserted into an optical fiber connector 201 shown in FIG. 2 and completes optical fiber junction in the accommodating cavity 100 of the first housing 10, the first welding bump 13 on the first housing 10 and the second welding bump 14 on the second housing 11 are melted through a welding process to form the colloid. The first housing 10 and the second housing 11 are then docked, and the first housing 10 and the second housing 11 are extruded using a clamp such that colloid remaining between the first housing 10 and the second housing 11 forms the connection layer 15. The connection layer 15 can connect and seal the first housing 10 and the second housing 11.

The first welding bump 13 on the first housing 10 is disposed around the opening of the accommodating cavity 100, and the second welding bump 14 on the second housing 11 is in contact with the first welding bump 13 after the first housing 10 and the second housing 11 are docked. Therefore, the connection layer 15 formed by the melted first welding bump 13 and second welding bump 14 can also be disposed around the opening of the accommodating cavity 100. Thus, after the first housing 10 and the second housing 11 are docked and extruded, a gap between the first housing 10 and the second housing 11 can be filled with the connection layer 15 around the accommodating cavity 100.

In this way, the second housing 11 can seal an internal component in the accommodating cavity 100 while blocking the opening of the accommodating cavity 100. This can reduce a probability that heat, cold, light, oxygen, and microorganisms in the outside nature enter the accommodating cavity 100 such that the optical fiber junction box has a specified IP rating.

In this case, the optical fiber junction box provided in this embodiment of this application is of a fully sealed structure. A junction process of an optical fiber inside the closure is completed before delivery of the optical fiber junction box. An external optical fiber and the optical fiber inside the closure can be spliced provided that the external optical fiber is inserted into the optical fiber connector 201 in FIG. 2 such that the optical fiber junction box achieves a plug-and-play effect.

In addition, because the first housing 10 and the second housing 11 are connected using the connection layer 15 formed by melting the first welding bump 13 and the second welding bump 14, the sealed optical fiber junction box provided in this application does not need to be sealed by extruding a rubber ring using a screw thread. In this way, a problem that sealing performance of the optical fiber junction box is reduced because the rubber ring encounters creep deformation during long-term use can be avoided.

Further, it can be learned from the foregoing descriptions that the first welding bump 13 and the first housing 10 may be of an integrated structure, and the second welding bump 14 and the second housing 11 may be of an integrated structure. The connection layer 15 formed by heating and melting the first welding bump 13 and the second welding bump 14 connects the first housing 10 to the second housing 11.

Therefore, an additional sealant such as a resin including a magnetically active material does not need to be added between the first housing 10 and the second housing 11 of the optical fiber junction box provided in this embodiment of this application such that complexity of the welding process and manufacturing costs can be reduced.

Structures of the first welding bump 13 and the second welding bump 14 are exemplified below.

Figure 6A:
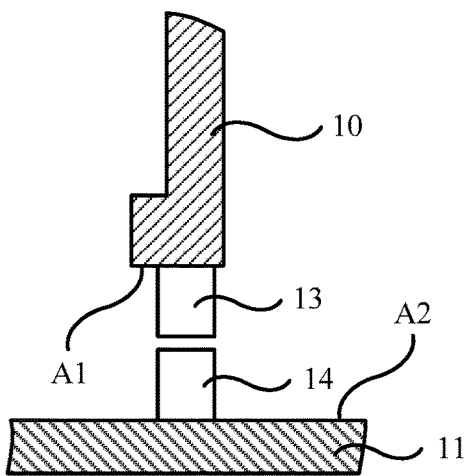
FIG. 6A is an enlarged schematic view of a region C in FIG. 4A.

In some embodiments of this application, as shown in FIG. 6A (a partially enlarged view of a region C in FIG. 4A), a longitudinal section of the first welding bump 13 is rectangular. In this embodiment of this application, the longitudinal section of the first welding bump 13 is perpendicular to the first mating surface A1 of the first housing 10.

When the first housing 10 is docked with the second housing 11, the second welding bump 14 and the first welding bump 13 may be symmetrically disposed. In this case, as shown in FIG. 6A, when the longitudinal section of the first welding bump 13 is rectangular, a longitudinal section of the second welding bump 14 is also rectangular. Similarly, the longitudinal section of the second welding bump 14 is perpendicular to the second mating surface A2 of the second housing 11.

It should be noted that, the case in which the second welding bump 14 and the first welding bump 13 are symmetrically disposed means that the second welding bump 14 and the first welding bump 13 are symmetrically disposed with respect to an interface formed by the docking of the first housing 10 and the second housing 11.

When the longitudinal sections of the first welding bump 13 and the second welding bump 14 are both rectangular, a surface that is of the first welding bump 13 and that faces the second welding bump 14 is a planar surface, and a surface that is of the second welding bump 14 and that faces the first welding bump 13 is a planar surface. In this way, when the first welding bump 13 and the second welding bump 14 are heated through the hot plate welding process, a contact area between a hot plate and the surface that is of the first welding bump 13 and that faces the second welding bump 14 and a contact area between the hot plate and the surface that is of the second welding bump 14 and that faces the first welding bump 13 are relatively large. Therefore, heating of the first welding bump 13 and the second welding bump 14 is more uniform, and the melted first welding bump 13 and second welding bump 14 are more easily bonded such that a better welding effect can be achieved.

In some other embodiments of this application, a surface that is of the first welding bump 13 and that is away from the first mating surface A1 of the first housing 10 has at least one protrusion.

Figure 6B:
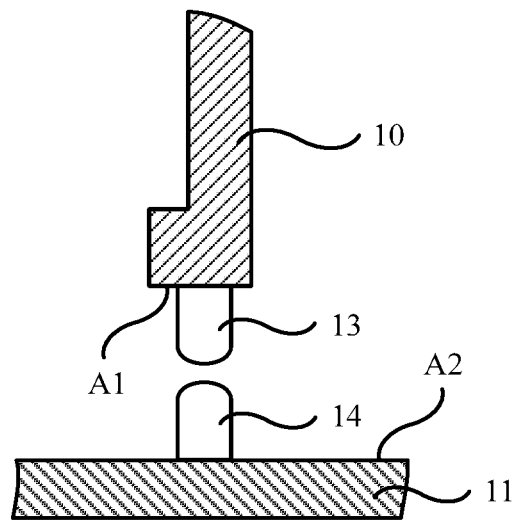
FIG. 6B is another enlarged schematic view of a region C in FIG. 4A.

For example, as shown in FIG. 6B, the surface that is of the first welding bump 13 and that is away from the first mating surface A1 of the first housing 10 is a downwardly protruding curved surface. If the second welding bump 14 and the first welding bump 13 are symmetrically disposed, a surface that is of the second welding bump 14 and that is away from the second mating surface A2 of the second housing 11 is an upwardly protruding curved surface.

Figure 6C:
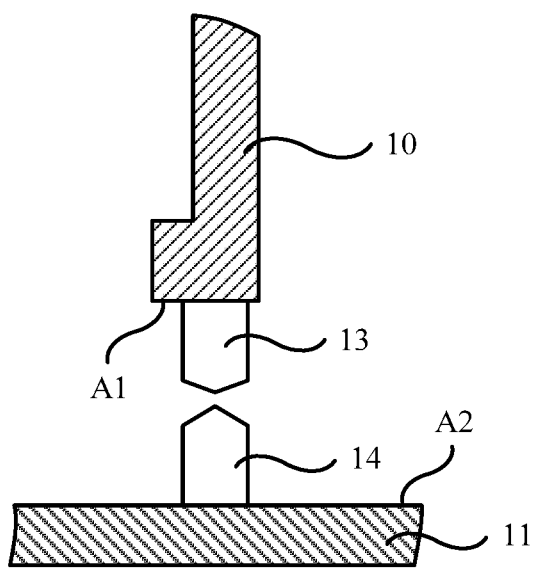
FIG. 6C is another enlarged schematic view of a region C in FIG. 4A.

Alternatively, for another example, as shown in FIG. 6C, a part that is of the longitudinal section of the first welding bump 13 and that is away from the first mating surface A1 is a downwardly protruding triangle. If the second welding bump 14 and the first welding bump 13 are symmetrically disposed, a part that is of the longitudinal section of the second welding bump 14 and that is away from the second mating surface A2 is an upwardly protruding triangle.

Figure 6D:
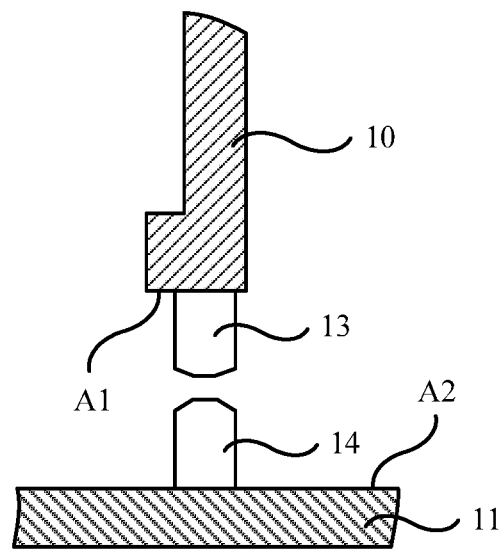
FIG. 6D is another enlarged schematic view of a region C in FIG. 4A.

Alternatively, for another example, as shown in FIG. 6D, a part that is of the longitudinal section of the first welding bump 13 and that is away from the first mating surface A1 is a downwardly protruding trapezoid. If the second welding bump 14 and the first welding bump 13 are symmetrically disposed, a part that is of the longitudinal section of the second welding bump 14 and that is away from the second mating surface A2 is an upwardly protruding trapezoid.

Figure 6E:
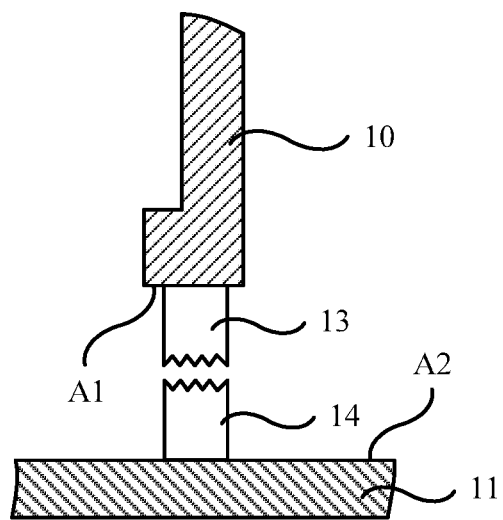
FIG. 6E is another enlarged schematic view of a region C in FIG. 4A.

Alternatively, for another example, as shown in FIG. 6E, the surface that is of the first welding bump 13 and that is away from the first mating surface A1 has a plurality of protrusions disposed at intervals such that the surface that is of the first welding bump 13 and that is away from the first mating surface A1 of the first housing 10 is uneven. If the second welding bump 14 and the first welding bump 13 are symmetrically disposed, a surface that is of the second welding bump 14 and that is away from the second mating surface A2 has a plurality of protrusions disposed at intervals such that the surface that is of the second welding bump 14 and that is away from the second mating surface A2 of the second housing 11 is uneven.

For any of the structures shown in FIG. 6B, FIG. 6C, FIG. 6D, and FIG. 6E, when the ultrasonic welding process is used, ultrasound energy may be concentrated on a downwardly protruding part of the surface that is of the first welding bump 13 and that faces the second welding bump 14 and an upwardly protruding part of the surface that is of the second welding bump 14 and that faces the first welding bump 13. Therefore, the first welding bump 13 and the second welding bump 14 can reach a welding temperature more easily such that a better welding effect can be achieved.

An example in which the second welding bump 14 and the first welding bump 13 are symmetrically disposed is used for description above. In some embodiments of this application, the second welding bump 14 and the first welding bump 13 may not be symmetrically disposed.

Figure 7A:
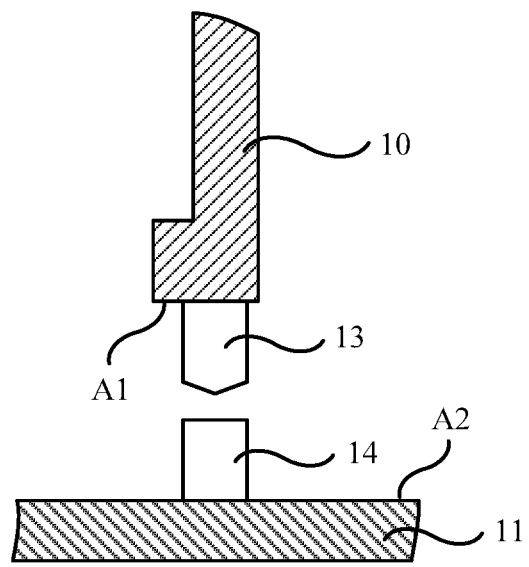
FIG. 7A is another enlarged schematic view of a region C in FIG. 4A.

For example, as shown in FIG. 7A, a part that is of the longitudinal section of the first welding bump 13 and that is away from the first mating surface A1 is a downwardly protruding triangle. The surface that is of the second welding bump 14 and that faces the first welding bump 13 is a planar surface. It can be learned from the foregoing descriptions that the first welding bump 13 may be heated and melted through the ultrasonic welding process. In addition, the second welding bump 14 may be heated and melted through the hot plate welding process.

Figure 7B:
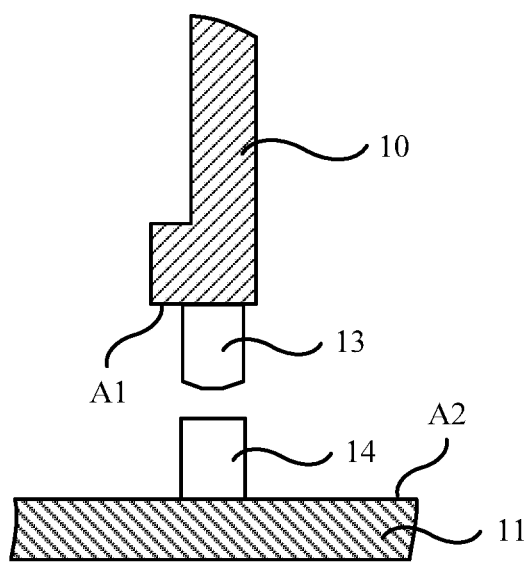
FIG. 7B is another enlarged schematic view of a region C in FIG. 4A.

Alternatively, for another example, as shown in FIG. 7B, a part that is of the longitudinal section of the first welding bump 13 and that is away from the first mating surface A1 is a downwardly protruding trapezoid. The surface that is of the second welding bump 14 and that faces the first welding bump 13 is a planar surface. In this case, the first welding bump 13 may be heated and melted through the ultrasonic welding process. In addition, the second welding bump 14 may be heated and melted through the hot plate welding process.

Figure 7C:
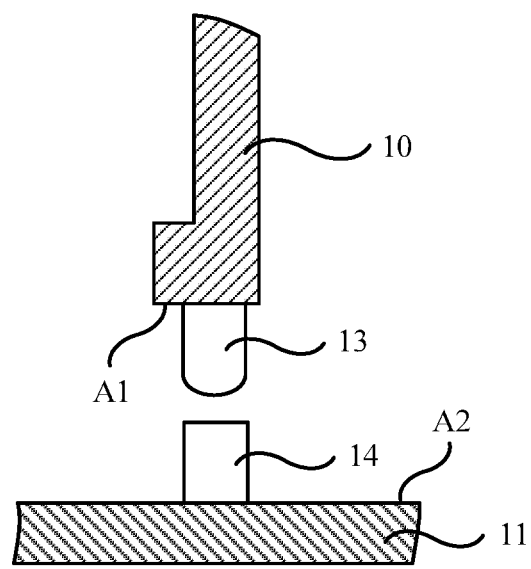
FIG. 7C is another enlarged schematic view of a region C in FIG. 4A.

Alternatively, for another example, as shown in FIG. 7C, the surface that is of the first welding bump 13 and that is away from the first mating surface A1 of the first housing 10 is a downwardly protruding curved surface. The surface that is of the second welding bump 14 and that faces the first welding bump 13 is a planar surface. In this case, the first welding bump 13 may be heated and melted through the ultrasonic welding process. In addition, the second welding bump 14 may be heated and melted through the hot plate welding process.

Figure 7D:
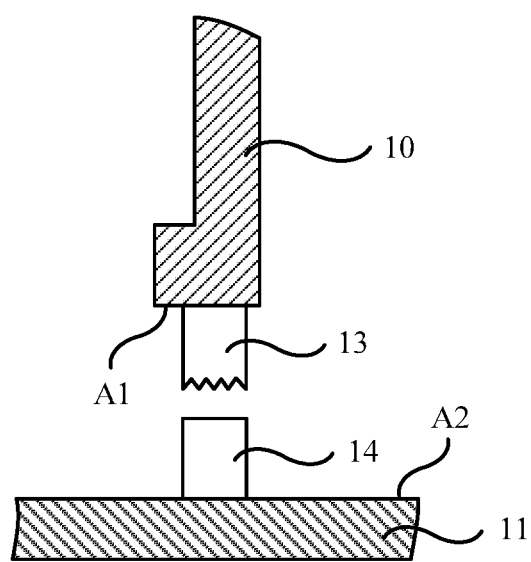
FIG. 7D is another enlarged schematic view of a region C in FIG. 4A.

Alternatively, for another example, as shown in FIG. 7D, the surface that is of the first welding bump 13 and that is away from the first mating surface A1 has a plurality of protrusions disposed at intervals such that the surface that is of the first welding bump 13 and that is away from the first mating surface A1 of the first housing 10 is uneven. The surface that is of the second welding bump 14 and that faces the first welding bump 13 is a planar surface. In this case, the first welding bump 13 may be heated and melted through the ultrasonic welding process. In addition, the second welding bump 14 may be heated and melted through the hot plate welding process.

For ease of description, the following provides descriptions using an example in which the surface that is of the first welding bump 13 and that faces the second welding bump 14 is a planar surface, the first welding bump 13 and the first housing 10 are of an integrated structure, the surface that is of the second welding bump 14 and that faces the first welding bump 13 is a planar surface, and the second welding bump 14 and the second housing 11 are of an integrated structure.

It can be learned from the foregoing descriptions that after the first welding bump 13 and the second welding bump 14 are heated and melted to form colloid, the first housing 10 and the second housing 11 need to be extruded such that a part of the colloid overflows, and the other part of the colloid remains between the first mating surface A1 and the second mating surface A2, to form the connection layer 15 for connecting the first housing 10 to the second housing 11. In an extrusion procedure, the overflowing colloid remains on inner surfaces and outer surfaces of the first housing 10 and the second housing 11. To avoid impact of the remaining colloid on appearance of the optical fiber junction box, colloid remaining on the outer surfaces of the first housing 10 and the second housing 11 may be removed using an external tool such as a blade or a scraper.

Figure 8A:
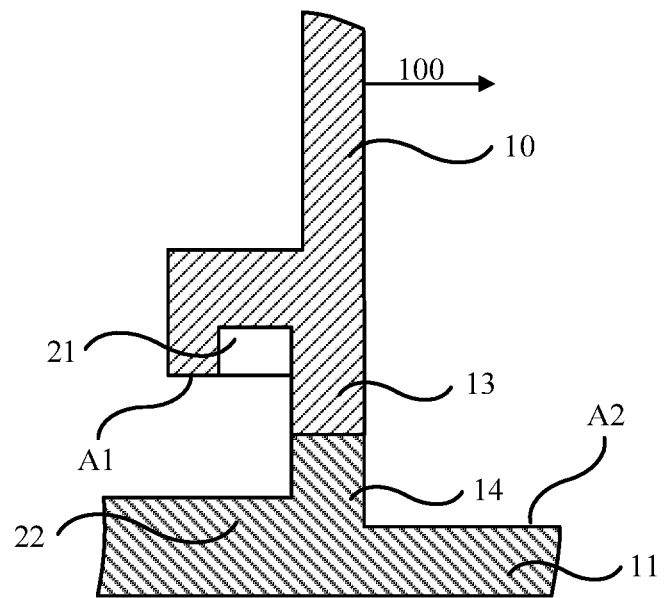
FIG. 8A is an enlarged schematic view of a region D in FIG. 3.

Alternatively, in some other embodiments of this application, the optical fiber junction box further includes at least one overflow groove. The overflow groove is configured to accommodate the colloid formed by heating and melting the first welding bump 13 and the second welding bump 14. For example, as shown in FIG. 8A (a partially enlarged view of a region D in FIG. 3), the overflow groove may include a first overflow groove 21 disposed on the first mating surface A1. The first overflow groove 21 is disposed around the first welding bump 13, and the first overflow groove 21 is mainly configured to accommodate liquid colloid formed by melting the first welding bump 13.

Figure 8B:
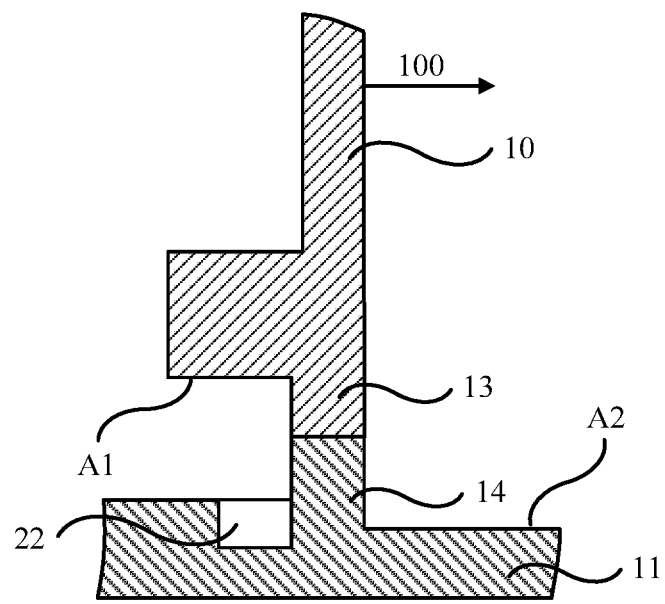
FIG. 8B is another enlarged schematic view of a region D in FIG. 3.

Alternatively, for another example, because liquid colloid can also be generated by melting the second welding bump 14, to accommodate this part of colloid, as shown in FIG. 8B (a partially enlarged view of a region D in FIG. 3), the overflow groove may include a second overflow groove 22 disposed on the second mating surface A2.

Figure 9A:
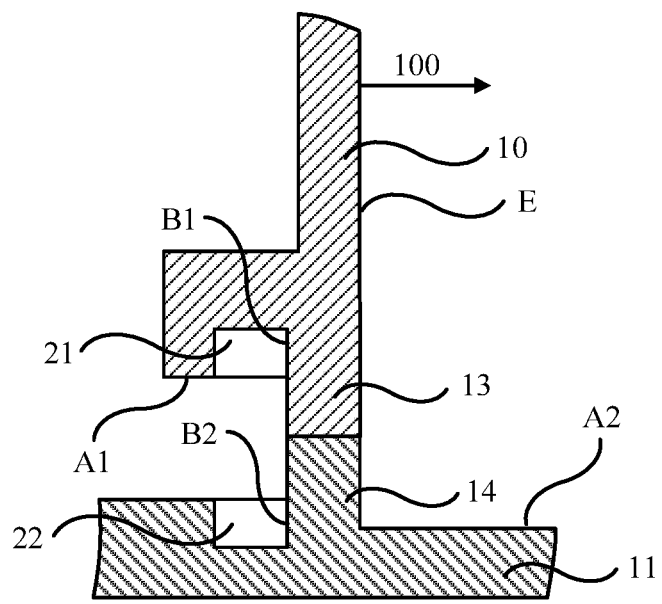
FIG. 9A is another enlarged schematic view of a region D in FIG. 3.
Figure 9B:
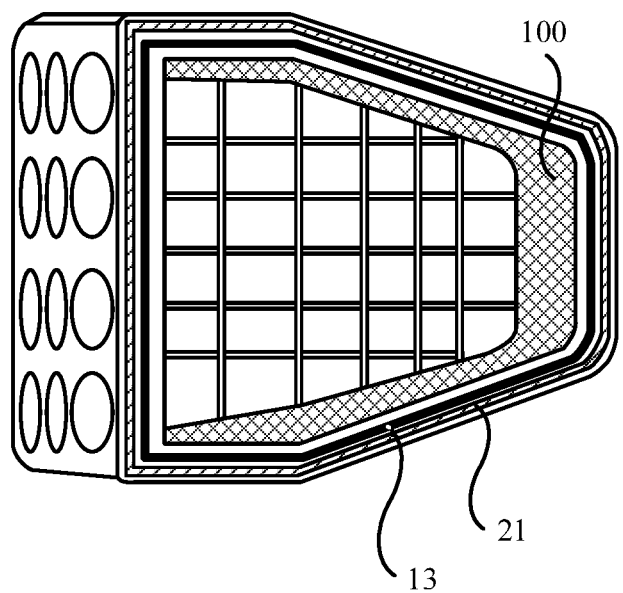
FIG. 9B is a schematic structural diagram of a first housing according to some embodiments of this application.
Figure 9C:
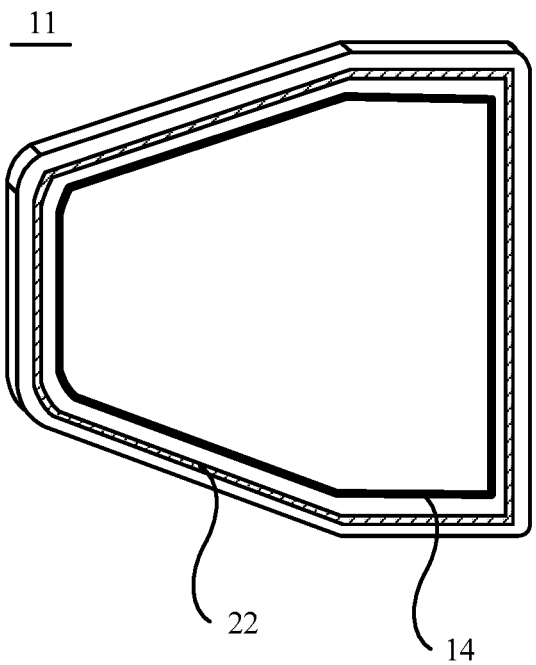
FIG. 9C is a schematic structural diagram of a second housing according to some embodiments of this application.

Alternatively, for another example, as shown in FIG. 9A (a partially enlarged view of a region D in FIG. 3), the optical fiber junction box includes two overflow groove the first overflow groove 21 disposed on the first mating surface A1 and the second overflow groove 22 disposed on the second mating surface A2. In addition, as shown in FIG. 9B, the first overflow groove 21 is disposed around the first welding bump 13. As shown in FIG. 9C, the second overflow groove 22 is disposed around the second welding bump 14. In this case, when the first housing 10 is docked with the second housing 11, as shown in FIG. 9A, one second overflow groove 22 and one first overflow groove 21 are symmetrically disposed.

It should be noted that, the case in which the second overflow groove 22 and the first overflow groove 21 are symmetrically disposed means that the second overflow groove 22 and the first overflow groove 21 are symmetrically disposed with respect to an interface formed by the docking of the first housing 10 and the second housing 11.

Figure 9D:
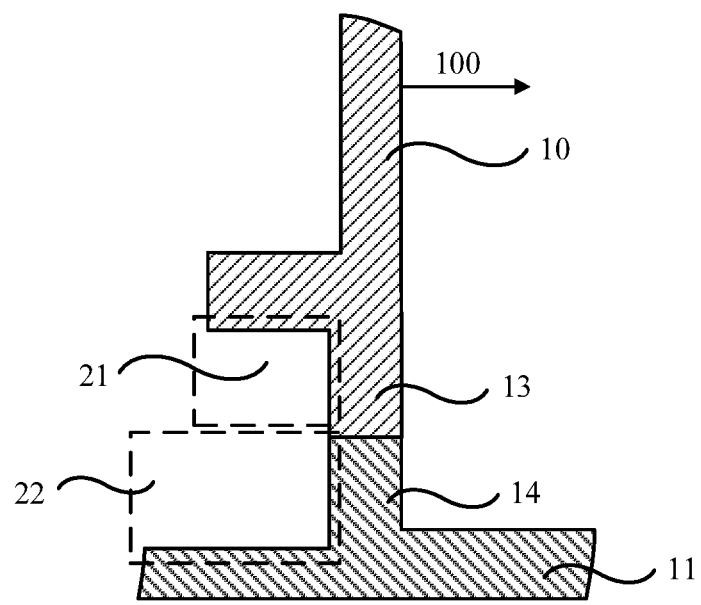
FIG. 9D is another enlarged schematic view of a region D in FIG. 3.
Figure 9E:
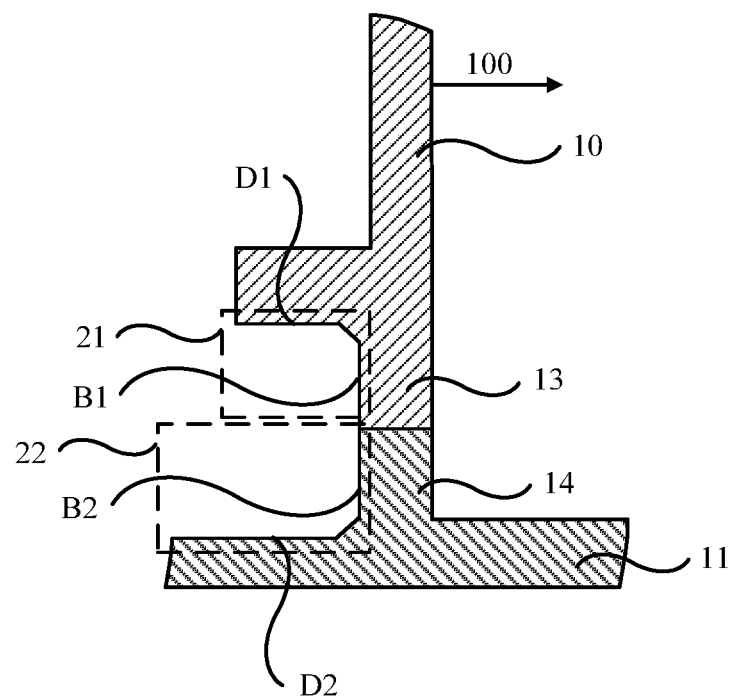
FIG. 9E is another enlarged schematic view of a region D in FIG. 3.
Figure 9F:
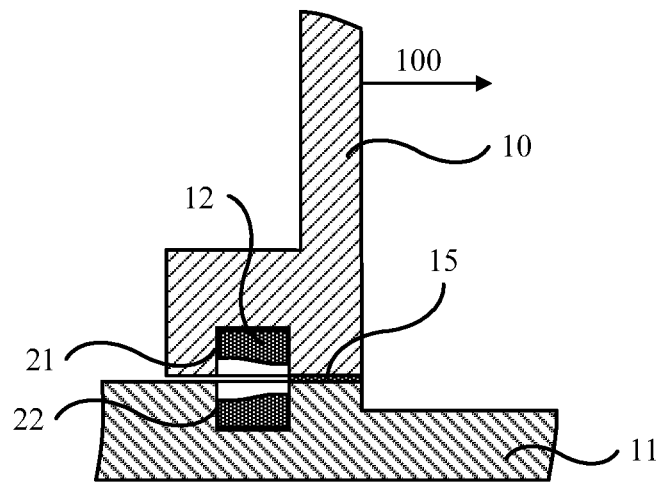
FIG. 9F is a cross-sectional view of a partial structure of a sealed optical fiber junction assembly according to an embodiment of this application.

In this case, after the first welding bump 13 and the second welding bump 14 in FIG. 9A are heated and melted to form the colloid, and the first housing 10 and the second housing 11 are extruded, a part of the colloid overflows as an overflowing part 12 shown in FIG. 9F and is accommodated in the first overflow groove 21 and the second overflow groove 22, and the other part of the colloid is located between the first housing 10 and the second housing 11 as the connection layer 15, to connect the first housing 10 to the second housing 11.

Based on this, after the first housing 10 and the second housing 11 are connected to form the optical fiber junction box, the first overflow groove 21 and the second overflow groove 22 may be disposed around the connection layer 15 formed by melting the first welding bump 13 and the second welding bump 14.

In addition, as shown in FIG. 9A, a groove wall B1 of the first overflow groove 21 is formed on a side surface that is of the first welding bump 13 and that faces the first overflow groove 21. In this way, the first overflow groove 21 is closest to the first welding bump 13 such that liquid colloid formed by heating and melting the first welding bump 13 can quickly flow into the first overflow groove 21.

Similarly, a groove wall B2 of the second overflow groove 22 is formed on a side surface that is of the second welding bump 14 and that faces the second overflow groove 22. In this way, the second overflow groove 22 is closest to the second welding bump 14 such that liquid colloid formed by heating and melting the second welding bump 14 can quickly flow into the second overflow groove 22.

In some embodiments of this application, when a wall thickness of a side wall of the accommodating cavity 100 of the first housing 10 is limited, as shown in FIG. 9A, only one first overflow groove 21 may be disposed on the first mating surface A1, and the first overflow groove 21 is located on one side that is of the first welding bump 13 (or the connection layer 15 formed by melting the first welding bump 13 and the second welding bump 14) and that is away from the accommodating cavity 100. Only one second overflow groove 22 is symmetrically disposed on the second mating surface A2, and the second overflow groove 22 is located on one side that is of the second welding bump 14 and that is away from the accommodating cavity 100.

In this way, the colloid formed by melting the first welding bump 13 and the second welding bump 14 can flow into the first overflow groove 21 and the second overflow groove 22 such that the colloid formed by melting the first welding bump 13 and the second welding bump 14 is prevented from overflowing to an outer surface of the optical fiber junction box in an extrusion procedure, thereby avoiding impact on appearance of the optical fiber junction box.

On this basis, when the wall thickness of the side wall of the accommodating cavity 100 of the first housing 10 is limited, as shown in FIG. 9A, a surface of one side that is of the first welding bump 13 and that is close to the accommodating cavity 100 is flush with an inner wall E of the accommodating cavity 100. Therefore, a width of the first welding bump 13 is increased as much as possible (in a same direction as the wall thickness of the accommodating cavity 100), to ensure that the melted first welding bump 13 can provide enough colloid to form the connection layer 15 between the first housing 10 and the second housing 11 together with the melted second welding bump 14.

Based on this, in some embodiments of this application, a volume of the first welding bump 13 may be less than or equal to a volume of the first overflow groove 21. In this way, after the first welding bump 13 is melted, colloid overflowing during extrusion does not overflow from the first overflow groove 21 after flowing into the first overflow groove 21, thereby reducing impact on appearance of the optical fiber junction box. Similarly, a volume of the second welding bump 14 may be less than or equal to a volume of the second overflow groove 22.

An example in which a longitudinal section of the first overflow groove 21 and a longitudinal section of the second overflow groove 22 in FIG. 9A are rectangular is used for description above. When an amount of colloid that overflows after the first welding bump 13 and the second welding bump 14 are melted and extruded is relatively small, as shown in FIG. 9D, the longitudinal sections of the first overflow groove 21 and the second overflow groove 22 may be alternatively L-shaped.

The L-shaped first overflow groove 21 or second overflow groove 22 may form an art designing groove, and the art designing groove may visually block the connection layer 15 between the first housing 10 and the second housing 11, thereby improving appearance of the optical fiber junction box.

It should be noted that, in this embodiment of this application, the longitudinal section of the first overflow groove 21 is perpendicular to the first mating surface A1. The longitudinal section of the second overflow groove 22 is perpendicular to the second mating surface A2.

In addition, to enable the colloid that overflows after the first welding bump 13 and the second welding bump 14 are melted and extruded to better flow into the first overflow groove 21 and the second overflow groove 22, as shown in FIG. 9E, there is a chamfer at a junction position between a groove bottom D1 and the groove wall B1 of the first overflow groove 21, and there is a chamfer at a junction position between a groove bottom D2 and the groove wall B2 of the second overflow groove 22. The chamfer facilitates flowing of colloid in the first overflow groove 21 and the second overflow groove 22 such that overflowing colloid can be more easily filled in the first overflow groove 21 and the second overflow groove 22.

An example in which only one first overflow groove 21 is disposed on the first mating surface A1 and only one second overflow groove 22 is symmetrically disposed on the second mating surface A2 is used for description above.

Figure 10A:
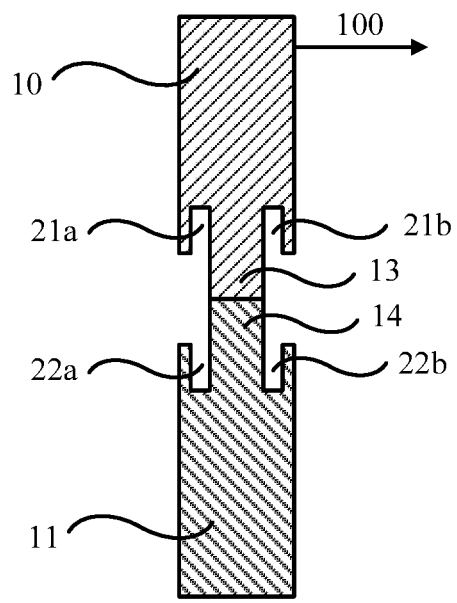
FIG. 10A is another enlarged schematic view of a region D in FIG. 3.

When the wall thickness of the side wall of the accommodating cavity 100 of the first housing 10 is relatively wide, the optical fiber junction assembly 01 includes two first overflow grooves shown in FIG. 10A: a first outer overflow groove 21a and a first inner overflow groove 21b. The first outer overflow groove 21a is located on one side that is of the first welding bump 13 (or the connection layer 15 formed by melting the first welding bump 13 and the second welding bump 14) and that is away from the accommodating cavity 100. The first inner overflow groove 21b is located on one side that is of the first welding bump 13 (or the connection layer 15 formed by melting the first welding bump 13 and the second welding bump 14) and that is close to the accommodating cavity 100.

In addition, a second outer overflow groove 22a symmetrical to the first outer overflow groove 21a and a second inner overflow groove 22b symmetrical to the first inner overflow groove 21b are disposed on the second mating surface A2.

In this way, a part of colloid flowing to the outside of the first housing 10 and the second housing 11 in the colloid that overflows after the first welding bump 13 and the second welding bump 14 are melted and extruded may be accommodated in the first outer overflow groove 21a and the second outer overflow groove 22a. A part of colloid flowing to the inside of the first housing 10 and the second housing 11 in the foregoing overflowing colloid may be accommodated in the first inner overflow groove 21b and the second inner overflow groove 22b.

Figure 10B:
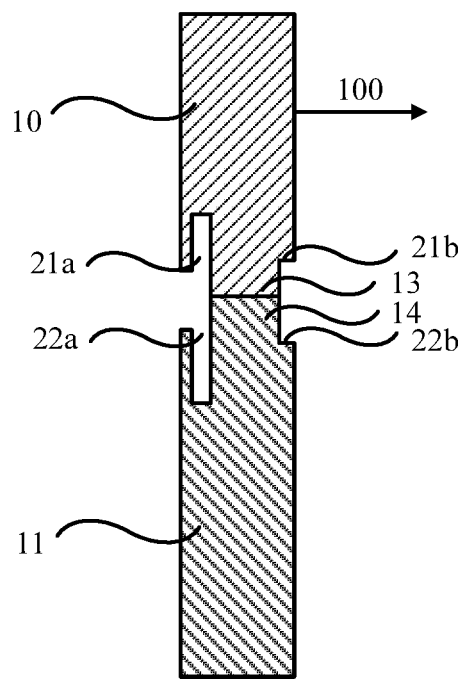
FIG. 10B is another enlarged schematic view of a region D in FIG. 3.

In addition, the part of colloid flowing to the inside of the first housing 10 and the second housing 11 in the overflowing colloid has little impact on appearance of the optical fiber junction box. Therefore, to reduce an area that is of the wall thickness of the side wall of the accommodating cavity 100 of the first housing 10 and that is occupied by the overflow groove, as shown in FIG. 10B, a volume of the first inner overflow groove 21b may be less than or equal to a volume of the first outer overflow groove 21a. Similarly, a volume of the second inner overflow groove 22b may be less than or equal to a volume of the second outer overflow groove 22a.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An optical fiber junction assembly comprising:
   a first housing comprising:
      a first mating surface; and
      an accommodating cavity, wherein an opening of the accommodating cavity is on the first mating surface;
   a plurality of optical fiber connection ports disposed on the first housing;
   a first welding bump disposed on the first mating surface and around the opening;
   a second housing comprising a second mating surface, wherein the second mating surface is disposed opposite to the first mating surface and configured to cover the opening when the second housing is docked with the first housing;
   a second welding bump disposed on the second mating surface and in contact with the first welding bump when the first housing is docked with the second housing,
   wherein the first welding bump and the second welding bump are configured to form a colloid after being heated and melted to couple and seal the first mating surface and the second mating surface; and
   an overflow groove disposed on at least one of the first mating surface or the second mating surface and configured to accommodate the colloid.

2. The optical fiber junction assembly of claim 1, wherein the overflow groove comprises a first overflow groove disposed on the first mating surface and around the first welding bump.

3. The optical fiber junction assembly of claim 2, wherein a groove wall of the first overflow groove is formed on a side surface of the first welding bump facing the first overflow groove.

4. The optical fiber junction assembly of claim 1, wherein the overflow groove comprises a second overflow groove disposed on the second mating surface and around the second welding bump.

5. The optical fiber junction assembly of claim 1, wherein a surface of one side of the first welding bump that is proximate to the accommodating cavity is flush with an inner wall of the accommodating cavity.

6. The optical fiber junction assembly of claim 1, wherein the first welding bump and the first housing are made of a same material and form an integrated structure.

7. A method for sealing an optical fiber junction assembly, wherein the optical fiber junction assembly comprises a first housing, a first welding bump, a second housing, a second welding bump, and an overflow groove, and wherein the method comprises:
 melting the first welding bump and the second welding bump;
 docking the first housing with the second housing, wherein the first housing comprises a first mating surface and an accommodating cavity, wherein an opening of the accommodating cavity is on the first mating surface, wherein a plurality of optical fiber connection ports are disposed on the first housing, wherein the first welding bump is disposed on the first mating surface and around the opening, wherein the second housing comprises a second mating surface, wherein the second mating surface is disposed opposite to the first mating surface and covers the opening, wherein the second welding bump is disposed on the second mating surface, and wherein the second welding bump is in contact with the first welding bump;
 extruding the first housing and the second housing to form a colloid using the first welding bump and the second welding bump such that the colloid connect and seal the first matting surface and the second matting surface, wherein a part of the colloid forms a connection layer between the first housing and the second housing, and wherein the overflow groove is disposed on at least one of the first mating surface or the second mating surface and configured to accommodate the colloid;
 curing the connection layer; and
 connecting the first housing to the second housing using the connection layer.

8. An optical fiber junction box comprising:
 a first housing comprising:
  a first mating surface; and
  an accommodating cavity, wherein an opening of the accommodating cavity is on the first mating surface;
 plurality of optical fiber connection ports disposed on the first housing;
 a second housing docked with the first housing and comprising a second mating surface disposed opposite to the first mating surface, wherein the second mating surface covers the opening;
 a connection layer made of a plastic material and located between the first mating surface and the second mating surface, wherein the connection layer is disposed around the opening and configured to:
  connect the first mating surface to the second mating surface; and
  seal the accommodating cavity; and
 an overflow groove disposed on at least one of the first mating surface or the second mating surface and configured to accommodate a colloid made of a same material as the connection layer.

9. The optical fiber junction box of claim 8, wherein the overflow groove comprises a longitudinal section that is L-shaped, and wherein the longitudinal section is perpendicular to at least one of the first mating surface or the second mating surface.

10. The optical fiber junction box of claim 9, wherein the overflow groove further comprises a groove bottom and a groove wall, and wherein a chamfer exists at a junction position between the groove bottom and the groove wall.

11. The optical fiber junction box of claim 8, wherein the overflow groove comprises a first overflow groove disposed on the first mating surface and around the connection layer.

12. The optical fiber junction box of claim 11, wherein the first overflow groove is disposed on one side of the connection layer away from the accommodating cavity.

13. The optical fiber junction box of claim 11, wherein the overflow groove comprises:
 a first outer overflow groove disposed on a first side of the connection layer away from the accommodating cavity; and
 a first inner overflow groove disposed on a second side of the connection layer proximate to the accommodating cavity.

14. The optical fiber junction box of claim 13, wherein a volume of the first inner overflow groove is less than or equal to a volume of the first outer overflow groove.

15. The optical fiber junction box of claim 8, wherein the overflow groove comprises a second overflow groove disposed on the second mating surface and around the connection layer.

16. The optical fiber junction box of claim 10, wherein the chamfer is configured to facilitate flow of the colloid in the overflow groove.

17. The optical fiber junction box of claim 8, wherein the overflow groove comprises a longitudinal section that is rectangular, and wherein the longitudinal section is perpendicular to at least one of the first mating surface or the second mating surface.

18. The optical fiber junction box of claim 16, wherein the overflow groove further comprises a groove bottom and a groove wall, and wherein a chamfer exists at a junction position between the groove bottom and the groove wall.

19. The optical fiber junction assembly of claim 1, wherein the overflow groove comprises a longitudinal section that is L-shaped, and wherein the longitudinal section is perpendicular to at least one of the first mating surface or the second mating surface.

20. The optical fiber junction assembly of claim 1, wherein the overflow groove comprises a longitudinal section that is rectangular in shape, and wherein the longitudinal section is perpendicular to at least one of the first mating surface or the second mating surface.

* * * * *

UNITED STATES PATENT AND TRADEMARK OFFICE
CERTIFICATE OF CORRECTION

PATENT NO. : 11,175,468 B2  
APPLICATION NO. : 16/993714  
DATED : November 16, 2021  
INVENTOR(S) : Zhang et al.

Page 1 of 1

It is certified that error appears in the above-identified patent and that said Letters Patent is hereby corrected as shown below:

In the Claims

Claim 8, Column 17, Line 45:  
"plurality of optical"  
Should read:  
"a plurality of optical"

Signed and Sealed this  
Eighteenth Day of January, 2022

Drew Hirshfeld  
*Performing the Functions and Duties of the*  
*Under Secretary of Commerce for Intellectual Property and*  
*Director of the United States Patent and Trademark Office*